United States Patent [19]

Staffanson

[11] Patent Number: 5,067,870
[45] Date of Patent: Nov. 26, 1991

[54] HAY BALE UNROLLER

[76] Inventor: Leroy Staffanson, Rte. 1 Box 3076, Sidney, Mont. 59270

[21] Appl. No.: 548,275

[22] Filed: Jul. 2, 1990

[51] Int. Cl.⁵ .............................................. B66C 23/18
[52] U.S. Cl. .................................... 414/724; 414/24.6; 414/911
[58] Field of Search ............... 414/724, 729, 910, 911, 414/912, 24.5, 24.6, 607

[56] References Cited

U.S. PATENT DOCUMENTS

| | | | |
|---|---|---|---|
| 4,099,629 | 7/1978 | Cox | 414/24.5 |
| 4,120,405 | 10/1978 | Jones et al. | 414/24.5 |
| 4,256,426 | 3/1981 | Buss | 414/24.5 |
| 4,275,985 | 6/1981 | Schremmer | 414/722 |
| 4,329,103 | 5/1982 | Miller | 414/24.5 |
| 4,886,409 | 12/1989 | Penner | 414/24.6 |
| 4,897,010 | 1/1990 | Golley | 414/24.6 |

Primary Examiner—David A. Bucci
Assistant Examiner—Donald W. Underwood
Attorney, Agent, or Firm—Norman B. Rainer

[57] ABSTRACT

A device for lifting, transporting and unwinding spirally wound cylindrical bales of hay utilizes a spear post mounted upon a grapple framework pivotably attached to the bucket of a front-end loader. A drive motor, interactive with the spear post, permits controlled positive unwinding of a bale supported upon the spear post.

3 Claims, 2 Drawing Sheets

HAY BALE UNROLLER

BACKGROUND OF THE INVENTION

This invention relates to the handling of large bales of hay, and more particularly concerns a device for handling spirally wound cylindrical bales.

The use of spirally wound bales of hay has become very popular in recent years for various reasons. Such bales may typically have a diameter of about six feet and an axially length of about five feet. However, their large size and weight, often 1500 to 2000 pounds, creates special problems in their handling and transportation. Handling devices have earlier been diclosed, but most of them are relatively complicated and hence expensive, requiring complex structure and operating features not useful for purposes other than bale handling. Other devices have been created which are inexpensive attachments to tractors, trucks, or other farm vehicles. These devices have been generally designed to impale and tranport bales. Such devices generally must be manually attached to the farm vehicle prior to use, and removed before the vehicle is used for other purposes. Furthermore, attached devices of this type have not been able to positively unwind the spirally wound bale in a manner to control the feed out of hay from the bale.

A front end loader, often referred to as a bucket loader, is a widely used piece of equipment found in many commercial and industrial applications such as construction and excavating operations, and numerous agricultural applications, including farming and livestock activities. Bucket loaders are of various sizes and configurations, but basically include a prime mover, such as a tractor or the like, having a pair of pivotably supported lift arms that are hydraulically driven to raise or lower a bucket attached to the ends of the lift arms and disposed in front of the tractor. A hydraulic cylinder is generally used to pivot the bucket about a horizontal axis so as to move the bucket from a load receiving to a load discharging position, and vise-versa. The primary use of a bucket loader is to transfer bulk materials such as sand, gravel, earth, manure, etc., from one location to another. For example, bucket loaders are used in livestock operations for scooping manure from the livestock pens and loading same on a spreader, while in construction operations a bucket loader may typically be used to transfer earth from a pile into a dump truck.

A common accessory to the bucket loader is the addition of a multiplicity of forwardly diposed grapple teeth downwardly directed from a framework which is pivotably connected to the top of the bucket structure. A hydraulic cylinder is used to pivot the grapple teeth framework about a horizontal axis in order to embrace large objects such as hay bales or loose compactible material such as loose hay. The grapple teeth may be pivoted to the upward position so as not to interfere with the operation of the bucket when handling normal bulk materials which do not require embracing.

Due to the large investment in a bucket loader, and for other reasons, it has been common practice to adapt bucket loaders to perform operations other than the transferring of bulk materials. This practice adds versatility to the loader and thereby eliminates the need and associated costs for using separate pieces of equipment or tools to perform these separately desired operations.

Several bucket-attached devices for handling hay bales have been earlier disclosed.

One such example of a handler for large round bales is disclosed in U.S. Pat. No. 4,120,405, wherein accessory structure having three spear-shaped bale engaging prongs is attached to a front-end loader. However, emplacement of the accessory structure requires that the bucket be removed, permitting the accesory structure to be directly attached to the lift or boom arms of the loader. Also the carried bale cannot be rotated.

Another type of round bale handler is disclosed in U.S. Pat. No. 3,921,837, wherein a pair of forks are attached by brackets to the sidewalls of the bucket.

Yet another round bale handler is described in U.S. Pat. No. 4,329,103, wherein the bale handling device must be removed to permit conventional use of the bucket loader.

The above-described bucket loader conversion units or attachments all suffer various shortcomings. Specifically none of these units are designed to controllably unwind hay from the round bale, and none are designed to be used in conjunction with a bucket loader equipped with accessory grapple teeth. Although some prior conversion units have advantages over other ones and certain ones have specific disadvantages, it can be concluded that there exists a need for an improved bucket loader conversion attachment which does not interfere with normal functions of the bucket. There also exists a need for a bale handling device which can controllably dispense hay from the bale and which will function in conjunction with grapple teeth.

It is accordingly an object of the present invention to provide a device adapted to mount upon the bucket of a front end loader to lift and transport hay bales.

It is another object of this invention to provide a device of the aforesaid nature which may be used on a bucket having grapple teeth.

It is a further object of the present invention to provide a device of the aforesaid nature which does not need to be removed from the bucket to permit other uses of the loader.

It is still another object of this invention to provide a device of the aforesaid nature which has means to controllably and rotationally pay out hay from the bale while being suspended or transported.

SUMMARY OF THE INVENTION

The above and other beneficial objects and advantages are accomplished in accordance with the present invention by a bale handling device adapted for use in operable joinder with a front-end bucket loader equipped with a bucket having an interior region bounded in part by a rear panel having upper and lower edges, said lower edge being pivotally joined to paired lifting arms of a vehicle, and a rectangular grapple framework pivotably associated with said upper edge and comprised of upper and lower parallel horizontal crossmembers spaced apart by parallel side members, said lower crossmember having a row of multiplicity of tooth-like pointed appendages directed toward said interior region, said device being comprised of:

a) support structure held within said framework, b) a rigid plate rotatably held by said support structure, c) a spear post perpendicularly emergent from said plate, d) a multiplicity of elongated braces having proximal extremities fixedly associated with said plate in a circular locus, and distal extremities attached to said spear post in a manner disposing said braces in a conical array, and e) a drive motor and associated power transmission means to controllably rotate said plate.

In a preferred embodiment, the drive motor may be hydraulically driven and secured to said support structure.

In another preferred embodiment, the power transmission means may be in the form of sprockets associated with the motor and the plate, and a chain may by utilized to transmit rotational force between said sprockets.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 1:
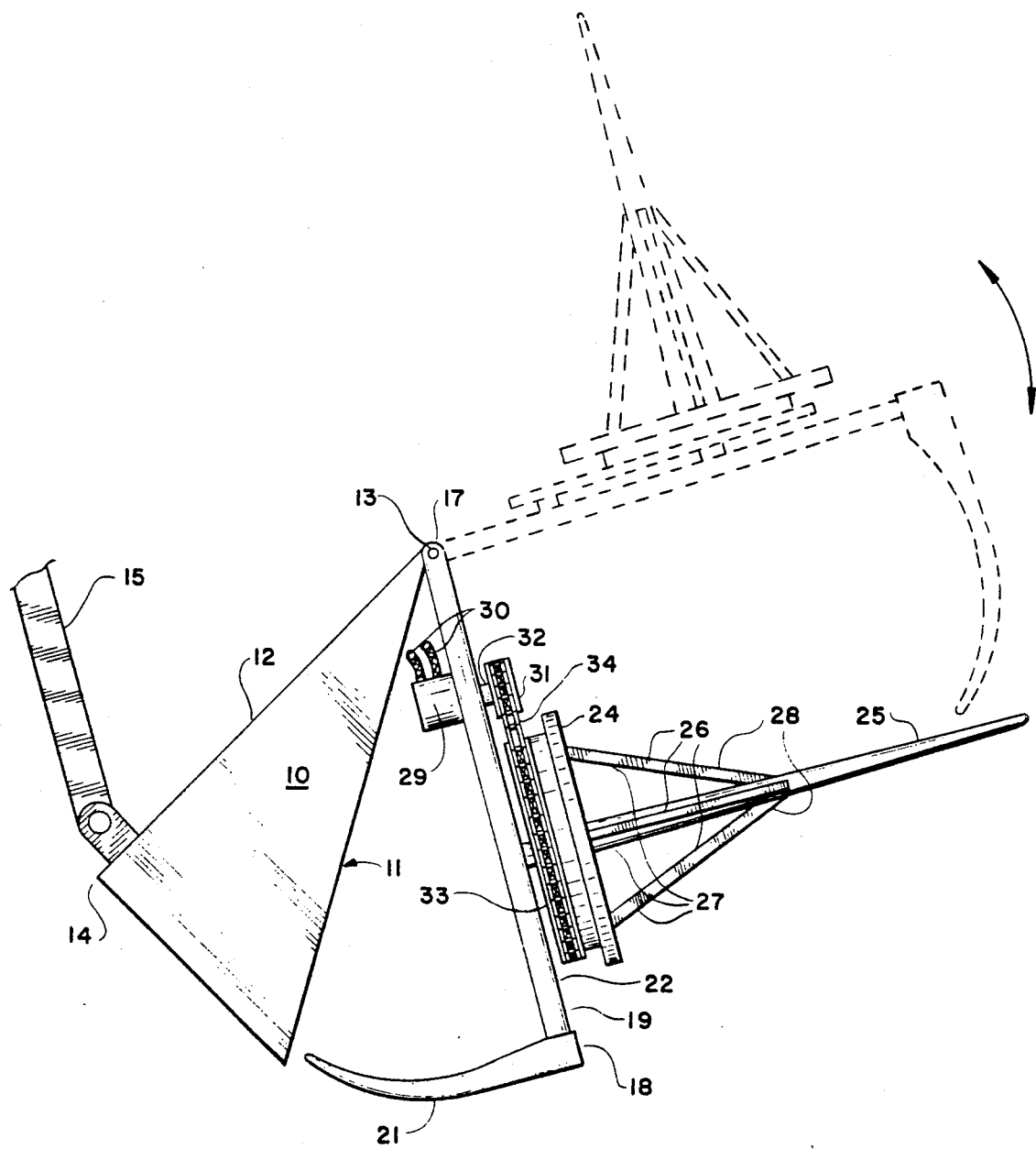
FIG. 1 is a side view of an embodiment of the device of the present invention.
Figure 2:
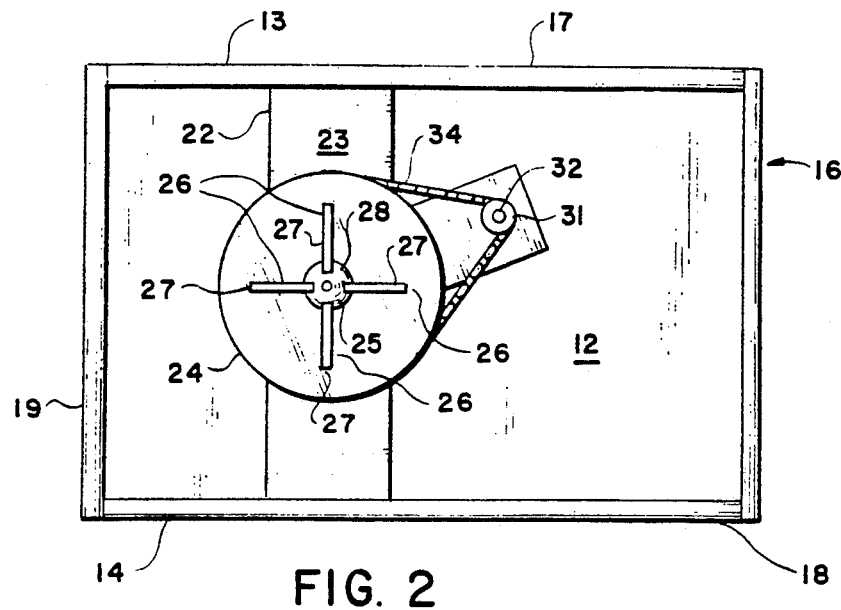
FIG. 2 is a front view of the embodiment of FIG. 1.
Figure 3:
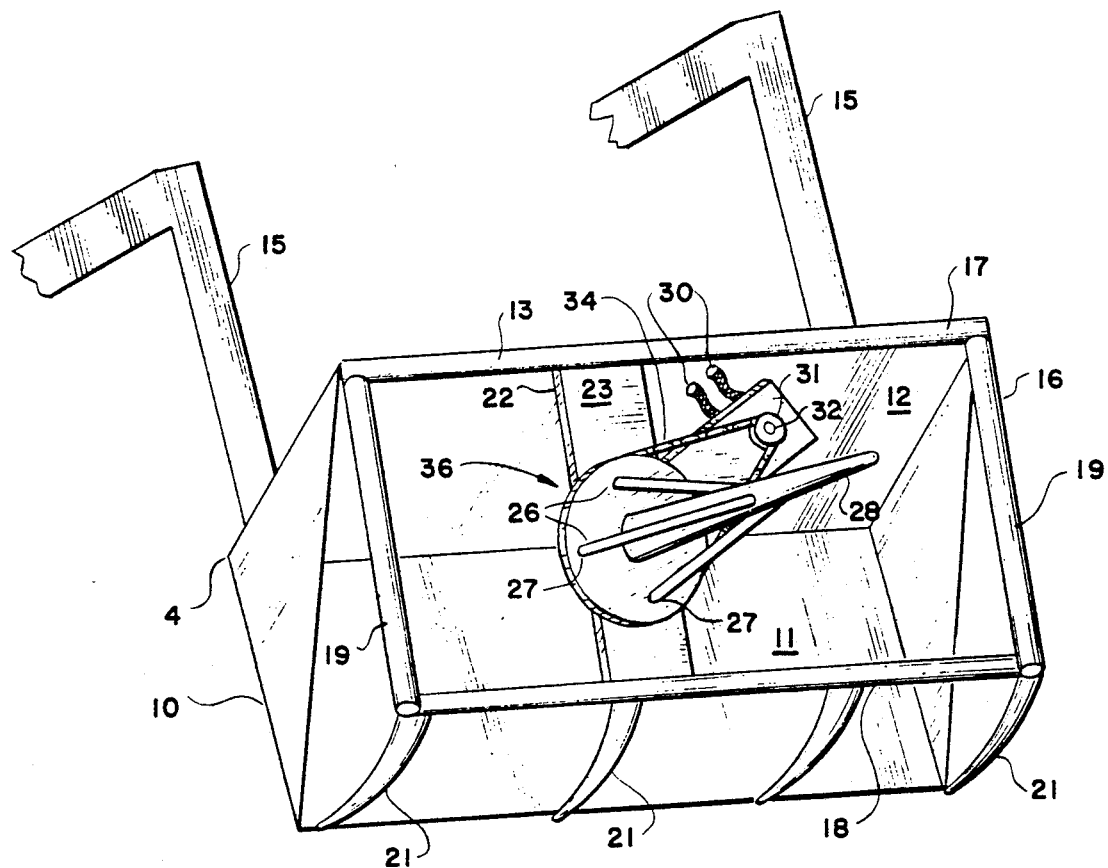
FIG. 3 is a perspective view of the embodiment of FIG. 1.

Referring to FIGS. 1-3, an embodiment of the device 36 of the present invention is shown in operable joinder with with a front-end bucket loader having a bucket 10 with an interior region 11 bounded in part by a rear panel 12 having upper and lower edges 13 and 14 respectively. Lower edge 14 is pivotally joined to paired lifting arms 15 of a vehicle. Rectangular grapple framework 16 is pivotably associated with upper edge 13 and comprised of upper and lower parallel horizontal crossmembers 17 and 18, respectively, spaced apart by parallel side members 19. Lower crossmember 18 has a multiplicity of parallel, perpendicularly affixed, pointed teeth 21 directed toward interior region 11. The device 36 of this invention is affixed between said upper and lower crossmembers, 17 and 18 respectively, of framework 16 by support structure in the form of panel 22, having forward surface 23. A rigid plate in the form of circular steel disk 24 is rotatably associated with forward surface 23 and thereby held by said support structure 22. A spear post 25 in the form of a sharpened steel rod perpendicularly emerges from plate 24. Elongated braces 26 having proximal extremities 27 fixedly associated with plate 24 in a circular locus, extend to distal extremities 28 attached to spear post 25 in a manner disposing braces 26 in a substantially conical array. A hydraulic drive motor 29 is powered by hydraulic fluid from the vehicle's hydraulic pump through hoses 30. Motor 29 is attached to support structure 22, and has a first sprocket wheel 31 fixedly associated with output shaft 32. A second sprocket wheel 33 is associated with disk 24 in a manner to receive rotational force from motor 29 through continous roller chain 34.

The spirally wound hay bale may be oriented into proper position by means of bucket 11 and grapple framework 16. A hay bale, resting on the ground, may then be impaled through its central axis, and thereby transported to a desired location after cutting the twine that binds the bale. The hay bale may be unwound by activating hydraulic motor 29. Braces 26 stabilize the spear post 25 and prevent uncontrolled rotation of the bale about the spear post.

When not in use for engaging a bale of hay, framework 16 with all components associated therewith, may be pivoted rearwardly about upper edge 13 of bucket 10 to a position as shown in phantom outline in FIG. 1. In its lower positions, adapted to interact with a bale of hay, the center axis of spear post 25 may be horizontally disposed. When controllably unwinding a bale of hay, the spear post may be at a slight upward angle of 5 to 10 degrees or sometimes more from horizontal. The bale is best unwound while the loader travels slowly in reverse, thereby avoiding driving upon the hay or interfering with feeding cows.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

What is claimed is:

1. A bale handling device adapted for use in operable joinder with a front-end bucket loader equipped with a bucket having an interior region bounded in part by a rear panel having upper and lower edges, said lower edge being pivotally supported by paired lifting arms, said device comprised of:

a) a rectangular grapple framework pivotably associated with said upper edge and comprised of upper and lower horizontal crossmembers spaced apart by parallel side members, said lower crossmember having a row of tooth-like pointed appendages directed toward said interior region, b) support structure held within said framework, c) a rigid plate rotatably held by said support structure, d) a spear post perpendicularly emergent from said plate, e) a multiplicity of elongated braces having proximal extremities fixedly associated with said plate in a circular locus, and distal extremities attached to said spear post in a manner disposing said braces in a conical array, and f) a drive motor and associated power transmission means to controllably rotate said plate.

2. The device of claim 1 wherein said drive motor is hydraulically driven and secured to said support structure.

3. The device of claim 1 wherein said power transmission means comprises sprocket wheels associated with said drive motor and plate and a continuous roller chain extending therebetween.

* * * * *